(12) United States Patent
Shiomi

(10) Patent No.: US 10,380,172 B2
(45) Date of Patent: Aug. 13, 2019

(54) PRESENTATION SUPPORT SYSTEM, PRESENTATION SUPPORT APPARATUS, AND PRESENTATION SUPPORT METHOD

(71) Applicant: KYOCERA Document Solutions Inc., Osaka-shi, Osaka (JP)

(72) Inventor: Ryo Shiomi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 13 days.

(21) Appl. No.: 15/660,557

(22) Filed: Jul. 26, 2017

(65) Prior Publication Data

US 2018/0032531 A1 Feb. 1, 2018

(30) Foreign Application Priority Data

Jul. 28, 2016 (JP) .................. 2016-148572

(51) Int. Cl.
*G06F 17/30* (2006.01)
*G06F 16/438* (2019.01)
*G06K 9/00* (2006.01)
*G06F 3/0484* (2013.01)

(52) U.S. Cl.
CPC ........ *G06F 16/4393* (2019.01); *G06F 3/0484* (2013.01); *G06K 9/00778* (2013.01)

(58) Field of Classification Search
CPC ......................... G06F 3/0484; G06F 17/30056
See application file for complete search history.

(56) References Cited

U.S. PATENT DOCUMENTS

2010/0257449 A1* 10/2010 Lieb ................. G06Q 10/10
715/730
2011/0282745 A1* 11/2011 Meoded ............. G06Q 30/0264
705/14.61

FOREIGN PATENT DOCUMENTS

| JP | 2007213282 A | 8/2007 |
| JP | 2008272019 A | 11/2008 |
| JP | 2014178358 A | 9/2014 |

OTHER PUBLICATIONS

Japanese Patent Office, Office Action Issued in Application No. 2016148572, dated Feb. 5, 2019, 7 pages.

* cited by examiner

*Primary Examiner* — Andrea C Leggett
(74) *Attorney, Agent, or Firm* — Alleman Hall Creasman & Tuttle LLP

(57) ABSTRACT

A presentation support system includes a presentation control portion, an imaging portion, and a number-of-watching-persons determining portion. The presentation control portion displays a presentation image on a screen in sequence. The imaging portion images a front of the screen from a screen side. The number-of-watching-persons determining portion determines a number of watching persons who are watching the presentation image, based on image data output from the imaging portion.

15 Claims, 8 Drawing Sheets

| SLIDE | TIME | NUMBER OF WATCHING PERSONS FOR EACH REGION | | | |
|---|---|---|---|---|---|
| | | R1 | R2 | R3 | R4 |
| A | T1 | 3 | 1 | 2 | 1 |
| A | T2 | 4 | 2 | 3 | 1 |
| A | T3 | 2 | 3 | 2 | 0 |
| A | T4 | 1 | 2 | 3 | 1 |
| A | T5 | 1 | 1 | 3 | 2 |
| A | T6 | 3 | 2 | 3 | 2 |
| B | T7 | 7 | 5 | 4 | 4 |
| B | T8 | 6 | 3 | 3 | 3 |
| ⋮ | ⋮ | ⋮ | ⋮ | ⋮ | ⋮ |

FIG. 7

| SLIDE | REGION | PRINTING IMAGE |
|---|---|---|
| A | R1 | IMAGE A1 |
| A | R2 | IMAGE A2 |
| A | R3 | IMAGE A3 |
| A | R4 | IMAGE A4 |
| B | R1 | IMAGE B1 |
| B | R2 | IMAGE B2 |
| B | R3 | IMAGE B3 |
| ⋮ | ⋮ | ⋮ |

# PRESENTATION SUPPORT SYSTEM, PRESENTATION SUPPORT APPARATUS, AND PRESENTATION SUPPORT METHOD

INCORPORATION BY REFERENCE

This application is based upon and claims the benefit of priority from the corresponding Japanese Patent Application No. 2016-148572 filed on Jul. 28, 2016, the entire contents of which are incorporated herein by reference.

BACKGROUND

The present disclosure relates to a presentation support system, a presentation support apparatus, and a presentation support method.

In general, there is known a presentation support system that causes a projector to display presentation images (slides) that are stored in a computer such as a notebook computer, onto a screen, thereby allowing for a presentation to be made to a plurality of viewers who are viewing the presentation images.

In the presentation using such a presentation support system, grasping whether or not the viewers are watching the presentation images is an important factor that affects the effect or result of the presentation.

SUMMARY

A presentation support system according to an aspect of the present disclosure includes a presentation control portion, an imaging portion, and a number-of-watching-persons determining portion. The presentation control portion displays a presentation image on a screen in sequence. The imaging portion images a front of the screen from a screen side. The number-of-watching-persons determining portion determines a number of watching persons who are watching the presentation image, based on image data output from the imaging portion.

A presentation support apparatus according to another aspect of the present disclosure includes a presentation control portion and a number-of-watching-persons determining portion. The presentation control portion displays a presentation image on a screen in sequence. The number-of-watching-persons determining portion determine s a number of watching persons who are watching the presentation image, based on image data output from an imaging portion that images a front of the screen from a screen side.

A presentation support method according to a further aspect of the present disclosure includes a presentation control step and a number-of-watching-persons determining step. In the presentation control step, a presentation image is displayed on a screen in sequence. In the number-of-watching-persons determining step, a number of watching persons who are watching the presentation image is determined based on image data output from an imaging portion that images a front of the screen from a screen side.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a diagram showing an example of information that indicates correspondence among regions, slides, and printing images, used in the presentation support apparatus according to the embodiment of the present disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Presentation Support System]

Figure 1:
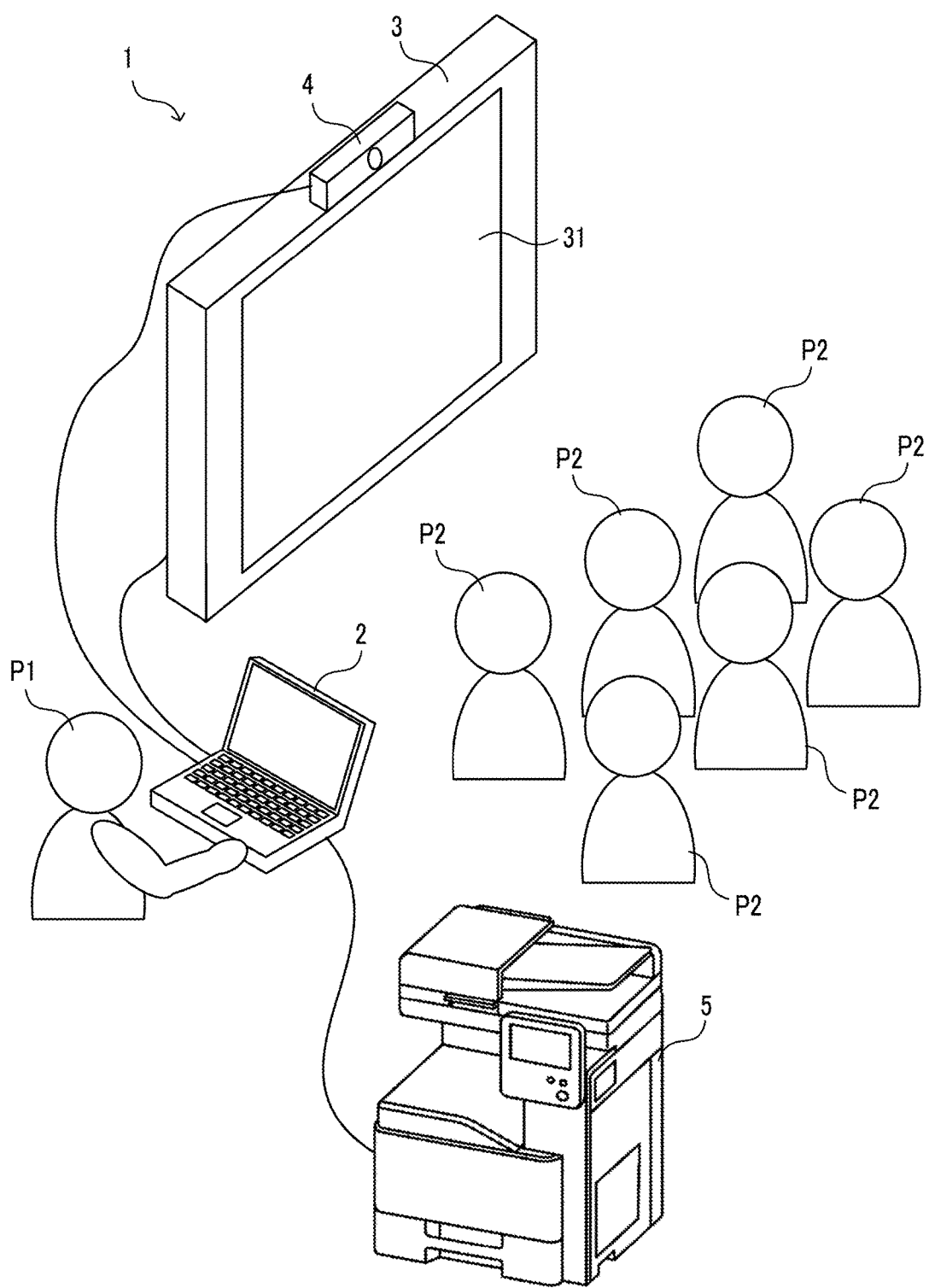
FIG. 1 is a diagram showing a configuration of a presentation support system according to an embodiment of the present disclosure.

As shown in FIG. 1, a presentation support system 1 according to the embodiment of the present disclosure includes a presentation support apparatus 2, a display device 3, an imaging portion 4, and an image forming apparatus 5.

The presentation support apparatus 2 is, for example, a computer such as a notebook computer. The presentation support apparatus 2 outputs, in sequence, a plurality of pieces of image data representing presentation images (hereinafter referred to as slides), for example, in response to operations performed by a presenter P1.

The display device 3 displays the slides on a screen 31 based on the image data output from the presentation support apparatus 2. It is noted that the display device 3 may be a projector that projects an image on a screen.

The imaging portion 4 images the front of the screen 31 from the screen 31 side, and outputs image data. The image data is input to the presentation support apparatus 2. The images imaged by the imaging portion 4 during the presentation of the presenter P1 include a plurality of viewers P2 who are viewing the presentation.

The image forming apparatus 5 executes a print process in response to an instruction from the presentation support apparatus 2.

[Presentation Support Apparatus]

Figure 2:
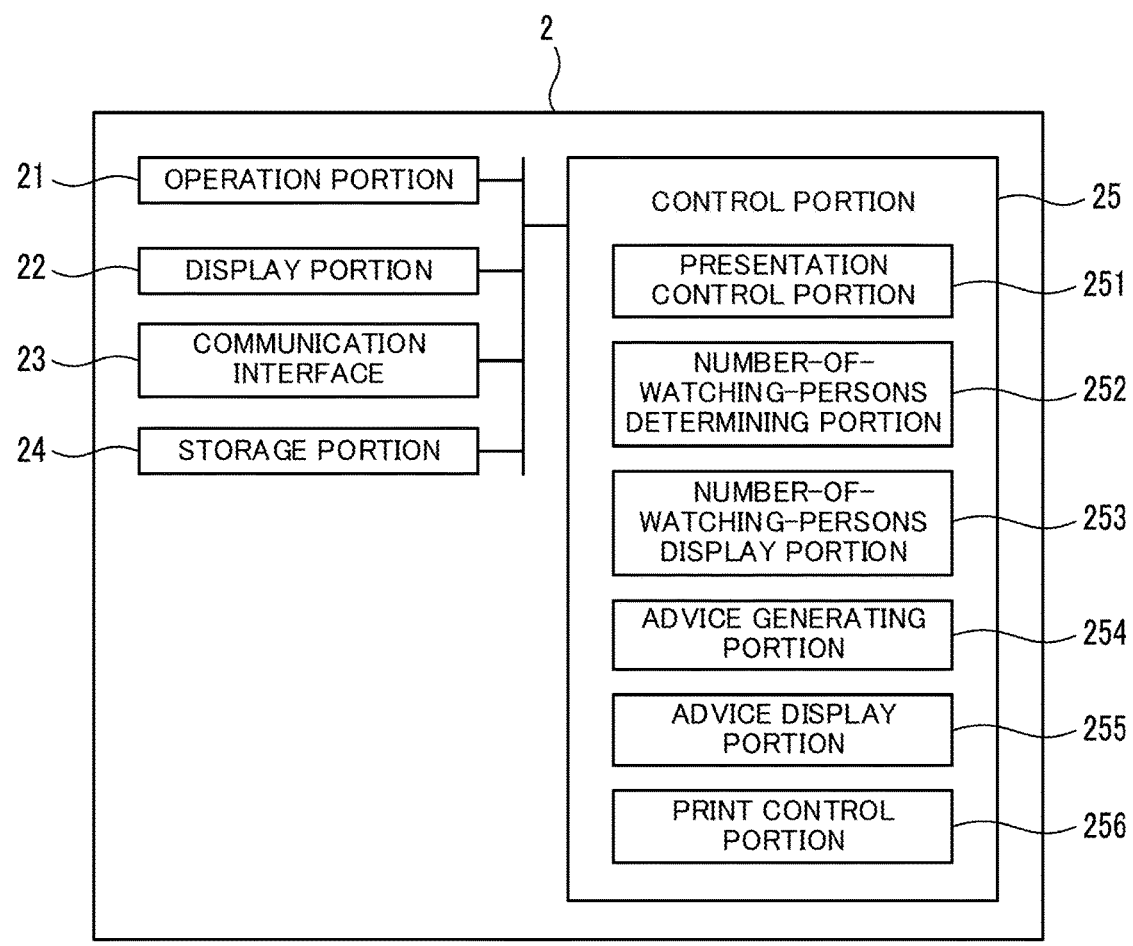
FIG. 2 is a block diagram showing a system configuration of a presentation support apparatus according to the embodiment of the present disclosure.

As shown in FIG. 2, the presentation support apparatus 2 includes an operation portion 21, a display portion 22, a communication interface 23, a storage portion 24, and a control portion 25.

The operation portion 21 is an input device configured to accept a user operation, and is an input device such as a keyboard, a touch pad, or a touch panel.

The display portion 22 is, for example, a liquid crystal display.

The communication interface 23 is an interface for communicating with an external device connected to the presentation support apparatus 2. The presentation support apparatus 2 can communicate with the display device 3, the imaging portion 4, and the image forming apparatus 5 via the communication interface 23.

The storage portion 24 is a nonvolatile storage device such as a hard disk. The storage portion 24 stores various control programs executed by the control portion 25, and various data used by the control portion 25.

The control portion 25 includes control equipment such as CPU, ROM, and RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU.

Specifically, the control portion 25 includes a presentation control portion 251, a number-of-watching-persons determining portion 252, a number-of-watching-persons display portion 253, an advice generating portion 254, an advice display portion 255, and a print control portion 256. It is noted that the control portion 25 functions as these processing portions when it executes various processes in accordance with the control programs. In addition, the control portion 25 may include an electronic circuit that implements part or all of processing functions of the processing portions.

The presentation control portion 251 displays the slides on the screen 31 in sequence by outputting the image data of the slides in sequence to the display device 3 in response to an instruction of the user input via the operation portion 21. The presentation control portion 251 may be implemented, for example, by a known software program for presentation.

The number-of-watching-persons determining portion 252 determines the number of watching persons who are watching the slide, namely, the number of viewers P2 who are closely watching the slide, based on the image data output from the imaging portion 4. The number-of-watching-persons determining portion 252 may determine the number of watching persons by, for example, performing a line-of-sight detection process for each viewer P2 by using a known line-of-sight detection technology.

Figures 3, 4:
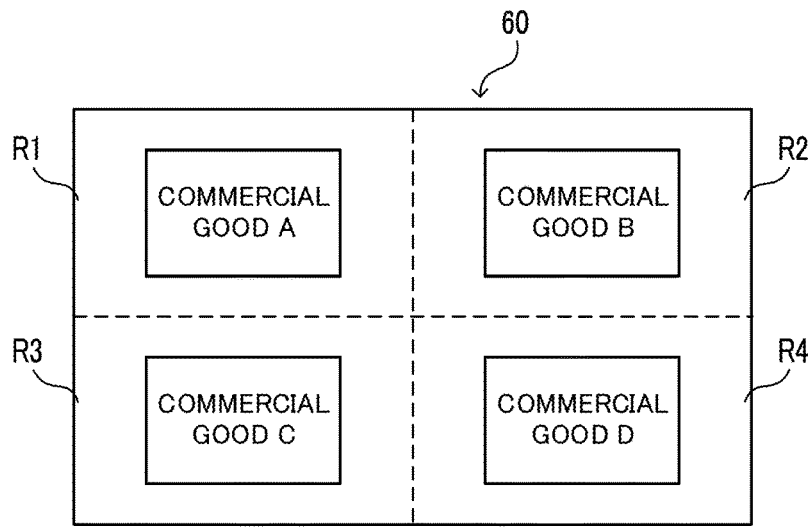
FIG. 3 is a diagram showing an example of a plurality of regions in a presentation image used in the presentation support apparatus according to the embodiment of the present disclosure.
FIG. 4 is a diagram showing an example of number-of-watching-persons information used in the presentation support apparatus according to the embodiment of the present disclosure.

The number-of-watching-persons determining portion 252 may determine the number of watching persons with respect to each of a plurality of regions that are included in the slide. For example, the number-of-watching-persons determining portion 252 may determine the number of watching persons with respect to each of four regions R1 to R4 included in the slide 60 as shown in FIG. 3.

The number-of-watching-persons determining portion 252 may determine the number of watching persons watching the slides at each of a plurality of time points set at regular time intervals. For example, the number-of-watching-persons determining portion 252 may determine the number of watching persons who are watching a slide A at each of time points T1 to T6 while the slide A is displayed on the screen 31 as shown in FIG. 4.

The number-of-watching-persons display portion 253 displays an image showing the number of watching persons determined by the number-of-watching-persons determining portion 252.

Figure 5:
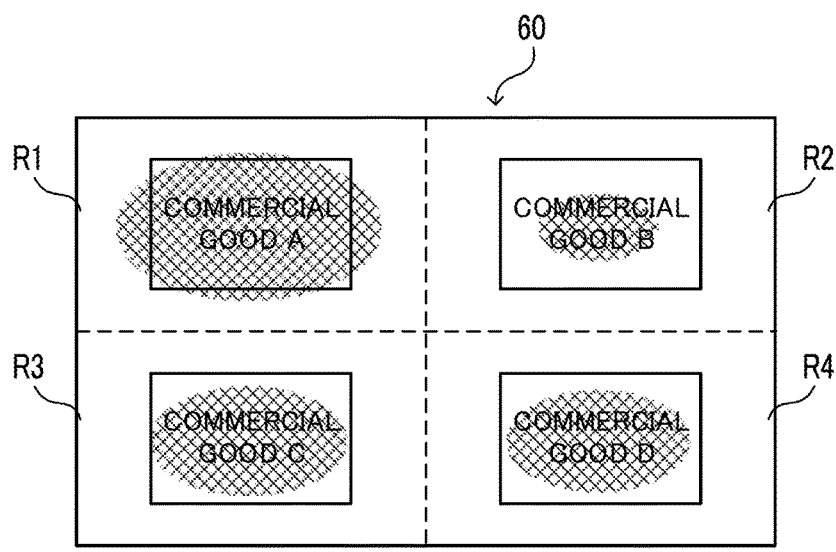
FIG. 5 is a diagram showing an example of an image that shows the number of watching persons for each of the regions, used in the presentation support apparatus according to the embodiment of the present disclosure.

The number-of-watching-persons display portion 253 may display the image showing the number of watching persons over the slide in an overlapping manner. For example, the number-of-watching-persons display portion 253 may display an image showing the number of watching persons determined by the number-of-watching-persons determining portion 252 with respect to each of the regions, over the slide in an overlapping manner. For example, as shown in FIG. 5, the number of-watching-persons display portion 253 may display an oval image whose size varies depending on the number of watching persons over each of the regions in the slide 60 in an overlapping manner.

The number-of-watching-persons display portion 253 may display a graph (see FIG. 6) that shows a change of the number of watching persons over time, based on the number of watching persons determined by the number-of-watching-persons determining portion 252 at each of the time points.

The advice generating portion 254 generates advice information based on the number of watching persons determined by the number-of-watching-persons determining portion 252. The advice information indicates an advice for the presenter P1 to make a good presentation.

The advice generating portion 254 may generate the advice information based on the number of watching persons determined by the number-of-watching-persons determining portion 252 with respect to each of the regions. For example, in a case where there is not much difference in the number of watching persons among the regions in the slide, the advice generating portion 254 may generate the advice information that urges to highlight a word or add a drawing in a region that is wanted to be watched.

The advice generating portion 254 may generate the advice information based on the number of watching persons determined by the number-of-watching-persons determining portion 252 at each of the time points. For example, when the number of watching persons decreases during a display of a slide, as in a case of slide B found in the graph of FIG. 6, it is determined that the interest of the viewers P2 to the slide B has decreased since the slide has been displayed (explained) for so long time. In that case, the advice generating portion 254 may generate the advice information that urges to shorten the display time of the slide.

Figure 10:
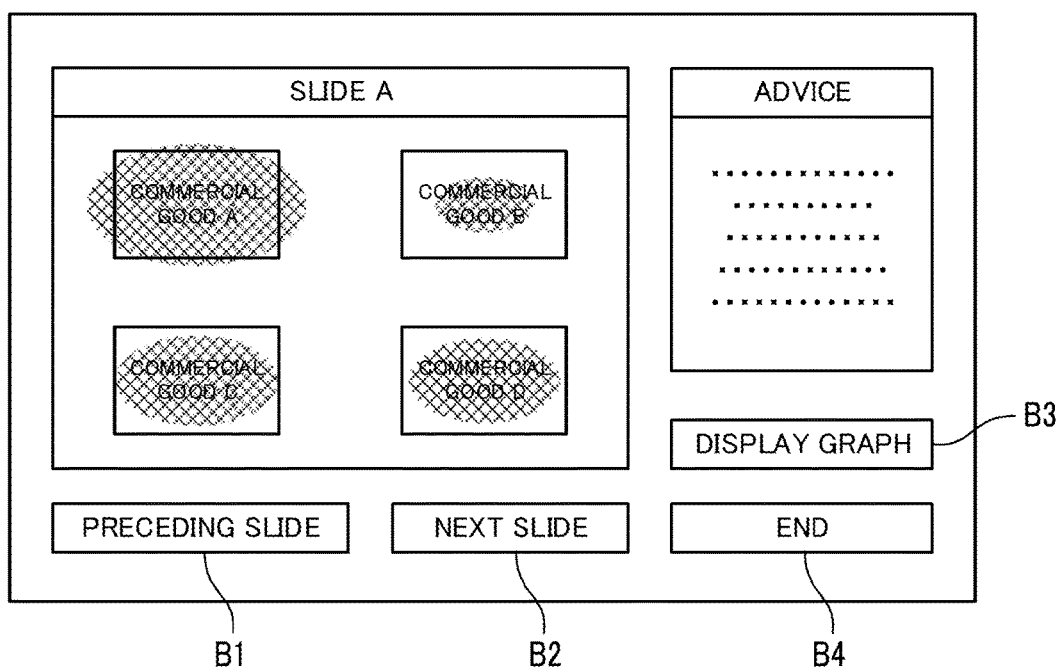
FIG. 10 is a diagram showing an example of an image displayed during the feedback process executed in the presentation support apparatus according to the embodiment of the present disclosure.

The advice display portion 255 displays the advice information generated by the advice generating portion 254, for example, on the display portion 22 (see FIG. 10).

The print control portion 256 causes the image forming apparatus 5 to execute a print process based on the number of watching persons determined by the number-of-watching-persons determining portion 252 with respect to each of the regions.

For example, the storage portion 24 stores a plurality of printing images that each correspond to any of the plurality of regions in each of the slides (see FIG. 7). The print control portion 256 sets the number of copies to print, for each of the plurality of printing images, based on the number of watching persons determined by the number-of-watching-persons determining portion 252 with respect to each of the regions. For example, the print control portion 256 may cause the image forming apparatus 5 to print an additional material regarding an item displayed in a region that was watched by a small number of persons, among items displayed in the regions in the slide so as to distribute printed copies of the additional material to the viewers P2. As an alternative example, the print control portion 256 may cause the image forming apparatus 5 to print an additional material regarding a commercial good displayed in a region that was watched by a large number of persons, among commercial goods displayed in the regions in the slide so as to distribute printed copies of the additional material to the viewers P2.

Meanwhile, usually the presenter P1 makes a presentation by watching the slide displayed on the screen 31, and it is difficult for him/her to determine, by sight, whether or not the viewers P2 are watching the slide. On the other hand, according to the presentation support system 1 of the present embodiment, as described above, it is possible to detect the number of watching persons who are watching the slide. As a result, the presenter P1 can confirm the number of watching persons who are watching the slide, without looking at the viewers P2. Furthermore, the presentation support system 1 of the present embodiment can display the detected number of watching persons in an easily understandable manner, display an advice based on the detected number of watching persons, and print an image based on the detected number of watching persons.

[Presentation Process]

Figure 8:
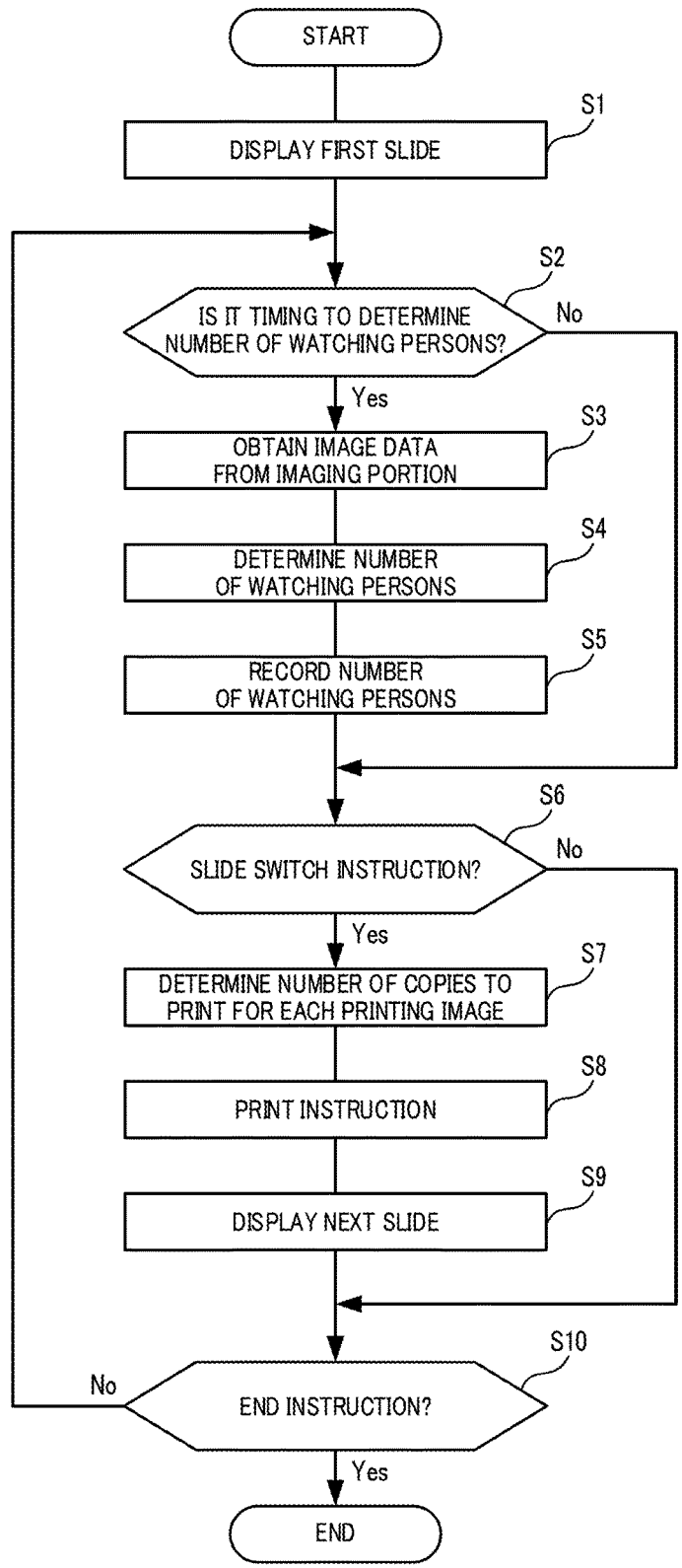
FIG. 8 is a flowchart showing an example of a procedure of a presentation process executed in the presentation support apparatus according to the embodiment of the present disclosure.

In the following, an example of the procedure of a presentation process executed by the control portion 25 is described with reference to FIG. 8. Here, steps S1, S2, . . . represent numbers assigned to the processing procedures (steps) executed by the control portion 25. It is noted that the presentation process is started in response to input of a presentation start instruction by the presenter P1, and then is ended in response to input of a presentation end instruction by the presenter P1. The presentation process is executed during an actual presentation made by the presenter P1 to the viewers P2.

<Step S1>

First, in step S1, the control portion 25 displays the first slide on the screen 31. Specifically, the control portion 25 outputs a piece of image data representing the first slide to the display device 3.

<Step S2>

In step S2, the control portion 25 determines whether or not it is timing to determine the number of watching persons. For example, when a predetermined time period has elapsed since the last determination of the number of watching persons, the control portion 25 determines that it is timing to determine the number of watching persons. When it is determined that it is timing to determine the number of watching persons (S2: Yes), the process moves to step S3. On the other hand, when it is determined that it is not timing to determine the number of watching persons (S2: No), the process moves to step S6.

<Step S3>

In step S3, the control portion 25 obtains image data from the imaging portion 4.

<Step S4>

In step S4, the control portion 25 determines the number of watching persons with respect to each of the regions included in a currently displayed slide, by detecting the lines of sight of the viewers P2 who are included in an image imaged by the imaging portion 4.

<Step S5>

In step S5, the control portion 25 records, into the storage portion 24, the number of watching persons with respect to each of the regions in the currently displayed slide, as, for example, number-of-watching-persons information shown in FIG. 4. The number-of-watching-persons information indicates correspondence between slides, times, and the numbers of watching persons for each of the regions.

<Step S6>

In step S6, the control portion 25, via the operation portion 21, determines whether or not a slide switch instruction has been input from the presenter P1. When it is determined that the slide switch instruction has been input (SG: Yes), the process moves to step S7. On the other hand, when it is determined that the slide switch instruction has not been input (S6: No), the process moves to step S1.

<Step S7>

In step S7, the control portion 25 determines the number of copies to print, for each of printing images corresponding to the regions included in the currently displayed slide, based on the number of watching persons for each of the regions. For example, with regard to a region that was watched by the largest number of persons, the control portion 25 sets the number of the viewers P2 as the number of copies to print, and with regard to the other regions, the control portion 25 sets zero as the number of copies to print.

<Step S8>

In step S8, the control portion 25 instructs the image forming apparatus 5 to print as many copies as the number of copies to print set in step S7. For example, the storage portion 24 stores in advance image data of a plurality of printing images, and also stores information that, as shown in FIG. 7, indicates correspondence among regions, slides, and printing images. The control portion 25 refers to the correspondence information, identifies a piece of image data representing a printing image to be printed, and transmits the identified piece of image data and the number of copies to print, to the image forming apparatus 5. This allows the image forming apparatus 5 to output a sheet with the printing image printed thereon.

<Step S9>

In step S9, the control portion 25 displays a next slide on the screen 31.

<Step S10>

In step S10, the control portion 25 determines, via the operation portion 21, whether or not a presentation end instruction has been input by the presenter P1. When it is determined that the presentation end instruction has been input (S10: Yes), the presentation process ends. On the other hand, when it is determined that the presentation end instruction has not been input (S10: No), the process returns to step S2.

It is noted that the processes of steps S1, S6 and S9 (presentation control step) are executed by the presentation control portion 251 of the control portion 25. In addition, the process of step S4 (number-of-watching-persons determining step) is executed by the number-of-watching-persons determining portion 252 of the control portion 25. In addition, the processes of steps S7 and S8 (print control step) are executed by the print control portion 256 of the control portion 25.

[Feedback Process]

Figure 9:
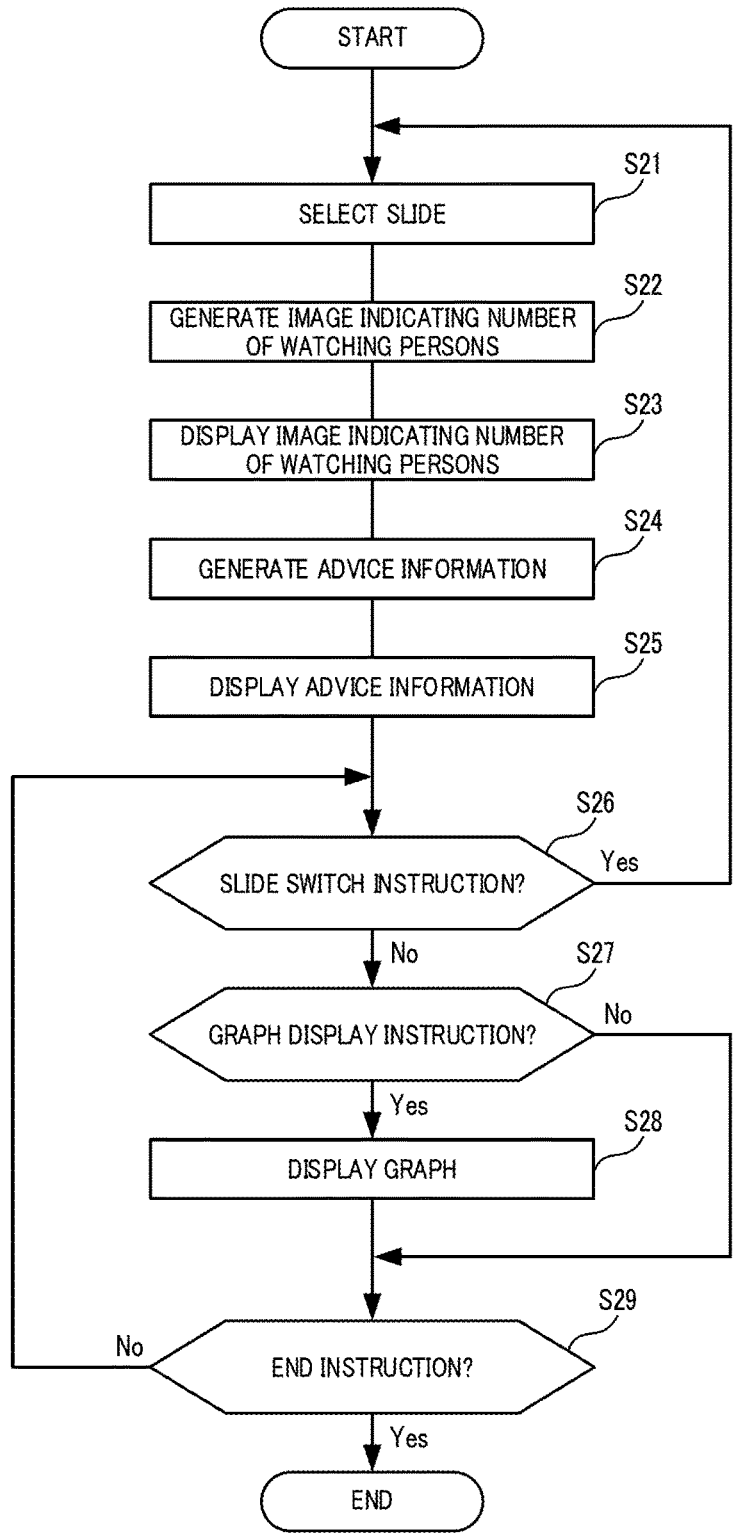
FIG. 9 is a flowchart showing an example of a procedure of a feedback process executed in the presentation support apparatus according to the embodiment of the present disclosure.

Next, an example of the procedure of the feedback process executed by the control portion 25 is described with reference to FIG. 9. It is noted that the feedback process is started in response to input of a feedback start instruction by the presenter P1, and then is ended in response to input of a feedback end instruction by the presenter P1. The feedback process is executed at an arbitrary timing after the presenter P1 has actually made the presentation to the viewers P2.

<Step S21>

In step S21, the control portion 25 selects a slide in response to an operation performed by the presenter P1.

<Step S22>

In step S22, the control portion 25 generates an image that indicates the number of watching persons for each of the regions in the slide selected in step S21, based on the number-of-watching-persons information shown in FIG. 4. For example, the control portion 25 generates oval images whose size varies depending on the number of watching persons with respect to each of the regions.

<Step S23>

In step S23, the control portion 25 displays, on the display portion 22, the image generated in step S22 over the slide selected in step S21 in an overlapping manner.

<Step S24>

In step S24, the control portion 25 refers to the number-of-watching-persons information shown in FIG. 4, and generates advice information based on the number of watching persons for each of the regions in the slide selected in step S21, or the number of watching persons for each of the time points.

<Step S25>

In step S25, the control portion 25 displays, on the display portion 22, the advice information generated in step S24.

As a result of the steps S21 to S25, the display portion 22 displays, for example, the image shown in FIG. 10. The display image includes buttons B1 and B2 that are used to switch between slides. In addition, the display image includes a button B3 for displaying a graph that indicates a change of the number of watching persons over time, and a button B4 for ending the feedback process.

<Step S26>

In step S26, the control portion 25 determines, via the operation portion 21, whether or not a slide switch instruction has been input by the presenter P1. For example, when the presenter P1 has selected the button B1 or the button B2 shown in FIG. 10, the control portion 25 determines that the slide switch instruction has been input. When it is determined that the slide switch instruction has been input (S26: Yes), the process returns to step S21. On the other hand, when it is determined that the slide switch instruction has not been input (S26: No), the process moves to step S27.

<Step S27>

In step S27, the control portion 25 determines, via the operation portion 21, whether or not a graph display instruction has been input by the presenter P1. For example, when the presenter P1 has selected the button B3 shown in FIG. 10, the control portion 25 determines that the graph display instruction has been input. When it is determined that the graph display instruction has been input (S27: Yes), the process moves to step S28. On the other hand, when it is determined that the graph display instruction has not been input (S27: No), the process moves to step S29.

<Step S28>

Figure 6:
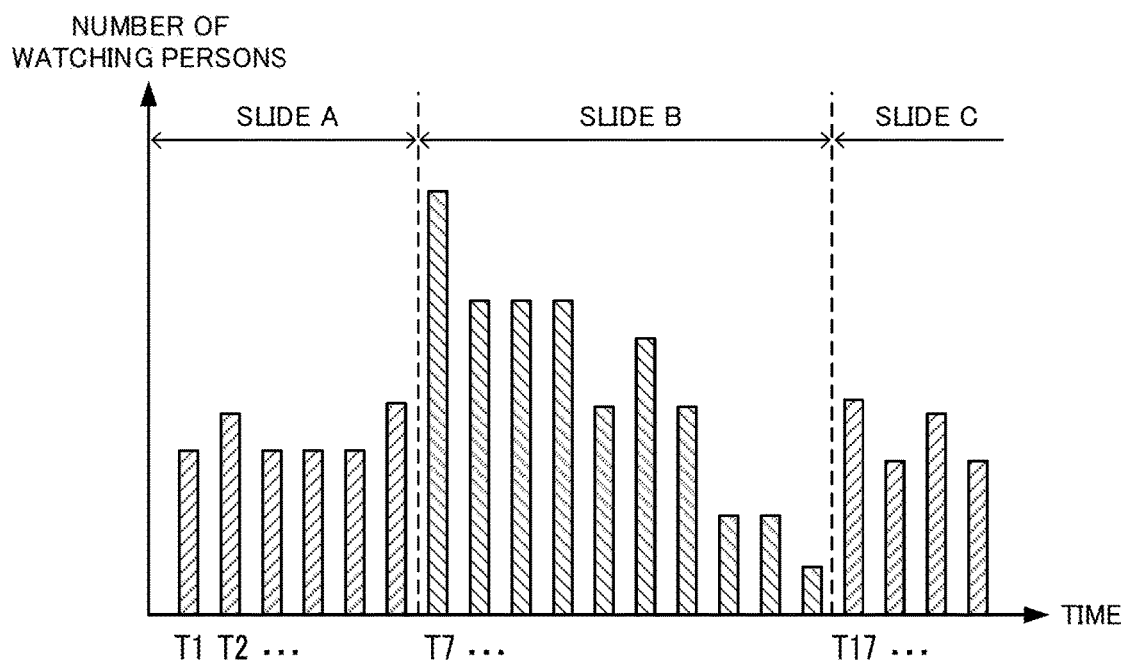
FIG. 6 is a diagram showing an example of a graph that shows a change of the number of watching persons over time, used in the presentation support apparatus according to the embodiment of the present disclosure.

In step S28, the control portion 25 generates a graph that shows a change of the number of watching persons over time as shown in FIG. 6, based on the number-of-watching-persons information shown in FIG. 4, and displays the graph on the display portion 22. The graph pops up, for example, on the display image shown in FIG. 10. Thereafter, when the pop-up display is closed by the presenter P1, the process moves to step S29.

<Step S29>

In step S29, the control portion 25 determines, via the operation portion 21, whether or not a feedback end instruction has been input by the presenter P1. When it is determined that the feedback end instruction has been input (S29: Yes), the feedback process is ended. On the other hand, when it is determined that the feedback end instruction has not been input (S29: No), the process returns to step S26.

It is noted that the processes of steps S22, S23, and S28 (number-of-watching-persons display step) are executed by the number-of-watching-persons display portion 253 of the control portion 25. In addition, the process of step S24 (advice generating step) is executed by the advice generating portion 254 of the control portion 25. In addition, the process of step S25 (advice display step) is executed by the advice display portion 255 of the control portion 25.

As described above, according to the present embodiment, it is possible to detect the number of watching persons who are watching the slide. Furthermore, according to the present embodiment, it is possible to display the detected number of watching persons in an easily understandable manner, display an advice based on the detected number of watching persons, or print an image based on the detected number of watching persons.

It is noted that the number-of-watching-persons information, as shown in FIG. 4, that has been recorded during the presentations may be collected in a database in correspondence with attribute information (class, area, generation, etc.) of the viewers P2 who participated in the presentations. The control portion 25 may propose an optimum slide configuration for each attribute of the viewers P2, based on the database. For example, the control portion 25 may propose an optimum slide configuration that would attract attention of aged people, based on the number of watching persons detected with respect to each of the slides during a presentation made for aged viewers P2.

It is noted that although in the present embodiment, one screen 31 and one imaging portion 4 are provided, the present disclosure is not limited to the configuration. For example, the display device 3 and the imaging portion 4 may be assigned to each of the viewers P2. In this case, the control portion 25 of the presentation support apparatus 2 can display a slide on the screen 31 of the display device 3 assigned to each of the viewers P2, and determine the number of watching persons based on the image data from the imaging portion 4 assigned to each of the viewers P2.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A presentation support system comprising:
an imaging sensor configured to image a front of a screen from a screen side to obtain image data; and
a processor configured to:
display a presentation image on the screen in sequence;
determine a number of watching persons who are watching the presentation image, based on the image data, the number of watching persons determined with respect to each of a plurality of regions in the presentation image in an overlapping manner;

display an image whose size varies depending on the number of watching persons over each of the plurality of regions; and display advice information based on the number of watching persons of each of the plurality of regions in the presentation image.

2. The presentation support system according to claim 1, wherein the processor is further configured to display an image showing the number of watching persons.

3. The presentation support system according to claim 2, wherein the processor is further configured to display the image showing the number of watching persons, over the presentation image in an overlapping manner.

4. The presentation support system according to claim 2, wherein the processor is further configured to:

determine the number of watching persons watching the presentation image at each of a plurality of time points set at regular time intervals, and display a graph that shows a change of the number of watching persons over time, based on the number of watching persons determined at each of the time points.

5. The presentation support system according to claim 1, wherein the processor is further configured to:

generate the advice information based on the number of watching persons.

6. The presentation support system according to claim 5, wherein the processor is further configured to generate the advice information based on the number of watching persons with respect to each of the plurality of regions.

7. The presentation support system according to claim 6, wherein the processor is further configured to generate advice information that urges a user to highlight a word or add a drawing.

8. The presentation support system according to claim 5, wherein the processor is further configured to:

determine the number of watching persons watching the presentation image at each of a plurality of time points set at regular time intervals, and generate the advice information based on the number of watching persons based on the number of watching persons at each of the time points.

9. The presentation support system according to claim 8, wherein when the number of watching persons decreases during a display of the presentation image, the processor is further configured to generate the advice information that urges a user to shorten display time of the presentation image.

10. The presentation support system according to claim 1, wherein the processor is further configured to:

determine the number of watching persons with respect to each of the plurality of regions in the presentation image, and cause an image forming apparatus to execute a print process based on the number of watching persons with respect to each of the plurality of regions.

11. The presentation support system according to claim 10, wherein the processor is further configured to:

store a plurality of printing images that each correspond to any of the plurality of regions in the presentation image, and set a number of copies to print, for each of the plurality of printing images, based on the number of watching persons with respect to each of the plurality of regions.

12. The presentation support system according to claim 11, wherein the processor is further configured to:

collect, in a database, information indicating the number of watching persons in correspondence with attribute information of viewers, and propose an optimum slide configuration for each attribute of the viewers, based on the database.

13. The presentation support system according to claim 1, wherein a display device and the imaging sensor are assigned to each of one or more viewers of the presentation image, and the processor is further configured to:

display the presentation image on a screen of the display device assigned to each of the one or more viewers, and determine the number of watching persons based on image data from the imaging sensor assigned to each of the one or more viewers.

14. A presentation support apparatus comprising:

a processor configured to:

display a presentation image on a screen in sequence;

determine a number of watching persons who are watching the presentation image, based on image data output from an imaging sensor that images a front of the screen from a screen side, the number of watching persons determined with respect to each of a plurality of regions in the presentation image in an overlapping manner;

display an image whose size varies depending on the number of watching persons over each of the plurality of regions; and display advice information based on the number of watching persons of each of the plurality of regions in the presentation image.

15. A presentation support method comprising:

displaying a presentation image on a screen in sequence;

determining a number of watching persons who are watching the presentation image, based on image data output from an imaging sensor that images a front of the screen from a screen side, the number of watching persons determined with respect to each of a plurality of regions in the presentation image in an overlapping manner;

displaying an image whose size varies depending on the number of watching persons over each of the plurality of regions; and displaying advice information based on the number of watching persons of each of the plurality of regions in the presentation image.

* * * * *